(12) United States Patent
Kubota (10) Patent No.: US 8,982,244 B2
(45) Date of Patent: Mar. 17, 2015

(54) IMAGE CAPTURING APPARATUS FOR LUMINANCE CORRECTION, A CONTROL METHOD THEREFOR, AND A RECORDING MEDIUM

(75) Inventor: Akira Kubota, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 13/600,881

(22) Filed: Aug. 31, 2012

(65) Prior Publication Data
US 2013/0063628 A1 Mar. 14, 2013

(30) Foreign Application Priority Data

Sep. 13, 2011 (JP) .................. 2011-199938

(51) Int. Cl.
*H04N 9/68* (2006.01)
*H04N 5/217* (2011.01)
*H04N 5/232* (2006.01)
*H04N 5/235* (2006.01)

(52) U.S. Cl.
CPC ........... *H04N 5/217* (2013.01); *H04N 5/23219* (2013.01); *H04N 5/2351* (2013.01)
USPC ....................................................... 348/234

(58) Field of Classification Search
CPC .......... H04N 5/23212; H04N 5/23219; H04N 5/2351; H04N 5/2353; H04N 5/2354
USPC ........ 348/235, 254, 234, 229.1; 382/167, 174
See application file for complete search history.

(56) References Cited

U.S. PATENT DOCUMENTS

| | | | | |
|---|---|---|---|---|
| 2007/0053607 A1* | 3/2007 | Mitsunaga | ..................... | 382/274 |
| 2009/0073287 A1* | 3/2009 | Shimizu | ........................ | 348/234 |
| 2009/0147105 A1* | 6/2009 | Du et al. | ........................ | 348/234 |
| 2010/0157112 A1* | 6/2010 | Miyagi | ........................ | 348/242 |
| 2010/0194919 A1* | 8/2010 | Ishii et al. | .................. | 348/224.1 |
| 2010/0238356 A1* | 9/2010 | Kida et al. | ..................... | 348/618 |

FOREIGN PATENT DOCUMENTS

JP 2008-072604 A 3/2008

* cited by examiner

*Primary Examiner* — Mekonnen Dagnew
(74) *Attorney, Agent, or Firm* — Carter, DeLuca, Farrell & Schmidt, LLP (57) ABSTRACT

A low-frequency region of an output target image is specified. Luminance correction is performed with the target amount decided in advance for a pixel, among pixels included in the target image, which is included in the low-frequency region and has a luminance value equal to or smaller than a predetermined value, and the target image after the correction is output. Then, an effective correction amount is obtained based on the luminance distribution of the target image before the correction and the luminance distribution of the target image after the correction, which has been corrected with the target amount decided in advance. A luminance correction target amount for the next correction target image is decided based on the luminance distribution of the target image and the ratio of the effective correction amount to the target amount decided in advance.

12 Claims, 9 Drawing Sheets

|   | Y1  | PixelNum | Y2  | $\Delta Y = \log_2(Y2/Y1)$ |
|---|-----|----------|-----|---------------------------|
| 1 | 16  | 30720    | 28  | +0.81                     |
| 2 | 32  | 46080    | 47  | +0.55                     |
| 3 | 64  | 53760    | 70  | +0.13                     |
| 4 | 96  | 61440    | 98  | +0.03                     |
| 5 | 128 | 69120    | 130 | +0.02                     |
| 6 | 192 | 72960    | 195 | +0.02                     |
| 7 | 255 | 76800    | 255 | –                         |

IMAGE CAPTURING APPARATUS FOR LUMINANCE CORRECTION, A CONTROL METHOD THEREFOR, AND A RECORDING MEDIUM

BACKGROUND OF THE INVENTION

1. Field of the Invention

The present invention relates to an image capturing apparatus, a control method therefor, and a recording medium and, more particularly, to a luminance correction technique for successively captured images.

2. Description of the Related Art

An image capturing apparatus such as a digital camera or digital video camera can correct a captured and obtained image to a desired state by applying various image processes to the image. Correction processing applied in the image capturing apparatus includes, for example, brightness correction, tone correction, and contrast correction. Most image capturing apparatuses determine the features of an obtained image, and apply those correction processes automatically or according to a set shooting mode or the like.

Correction processing for an image is applied to, for example, a backlit scene in which a light source exists in the background of an object. In a backlit scene in which the sun is in the background of a person as a main object, for example, the surface of the main object which faces the image capturing apparatus is shaded, thereby decreasing the luminance. In this case, by emitting flash light to shoot an image under exposure conditions where no blown-out highlight occurs in the background, it is possible to obtain an image in a state in which the object and the bright background are preferable while ensuring the luminance of the main object. Using flash light as artificial light may make the luminance of the main object unnatural, or cause shadow-detail loss because the flash light does not reach the main object, depending on the distance between the main object and the image capturing apparatus to decrease the luminance of the main object. In recent years, therefore, a shadow-detail loss region and a blown-out highlight region are reduced by applying, to an image shot in a backlit scene, image processing for performing tone connection for a luminance signal. More specifically, a signal amplification ratio is changed according to the signal level (brightness) of each pixel or a tone level to be assigned is adjusted for each signal level range to which each pixel belongs, thereby performing correction.

Figure 9A:
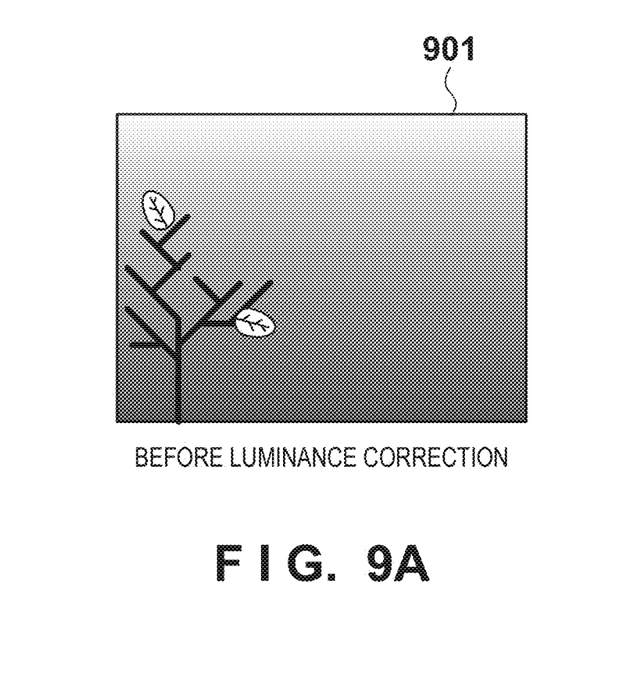
FIGS. 9A and 9B are views for explaining the conventional problems associated with luminance correction for each frequency component of an image.
Figure 9B:
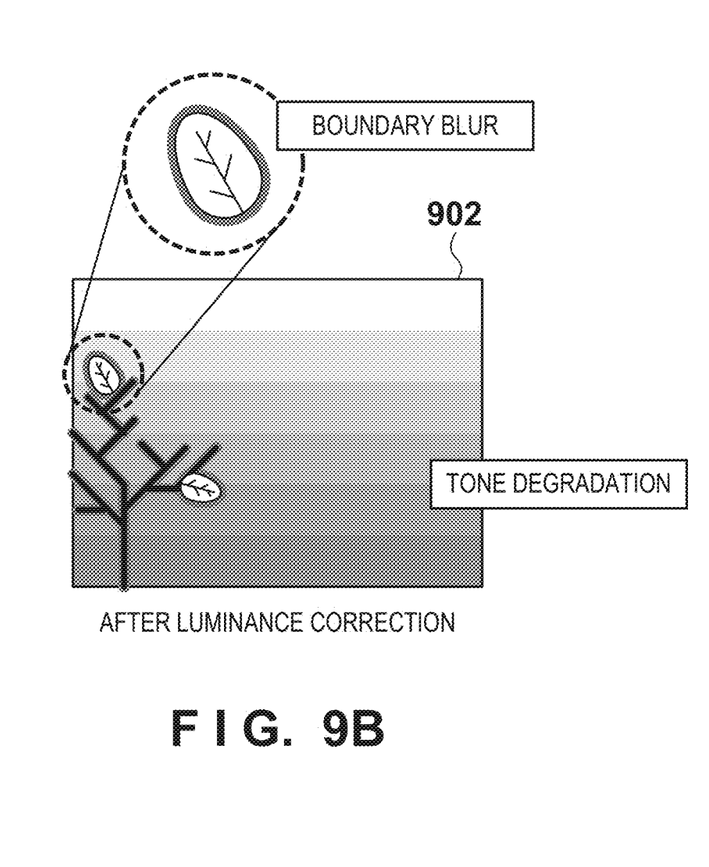

If luminance correction is performed for all the pixels of an image as described above, the following problems may occur depending on an object in the image. FIG. 9A shows an image 901 captured in a backlit scene in which the sky and a tree are included in a shooting range. In the image 901, a region corresponding to the sky has a luminance higher than that of a region corresponding to the tree, and luminance gradation in which the luminance gradually decreases from the upper portion of the image to the lower portion is seen. If luminance correction of assigning a luminance to each signal level range as described above is performed for all the pixels of the image, an image 902 shown in FIG. 9B is obtained. In the image 902, a boundary portion between the sky region with a high luminance and the tree region with a low luminance blurs. This is because the surrounding region of the tree is a so-called high-frequency component region, where pixels representing branches and leaves of the tree with a low luminance are frequently mixed with pixels representing the sky with a high luminance. In extracting a desired high-frequency component region, whether each pixel existing near the boundary between bright and dark regions is a luminance correction target pixel or non-target pixel is based, in part, on the region extraction performance. If a pixel with a high luminance level to some extent which should not actually be a correction target is extracted as a high-frequency component region to be corrected, and is corrected to be brighter, the boundary portion may blur.

Figure 10A:
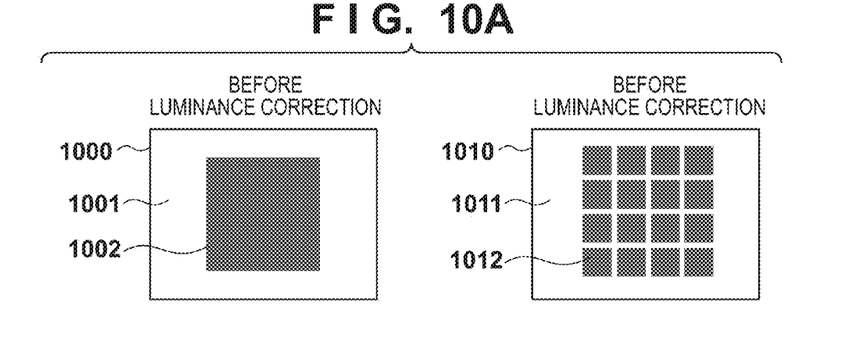
FIGS. 10A, 10B, and 10C are views for exemplifying luminance correction for each frequency component of images.
Figure 10B:
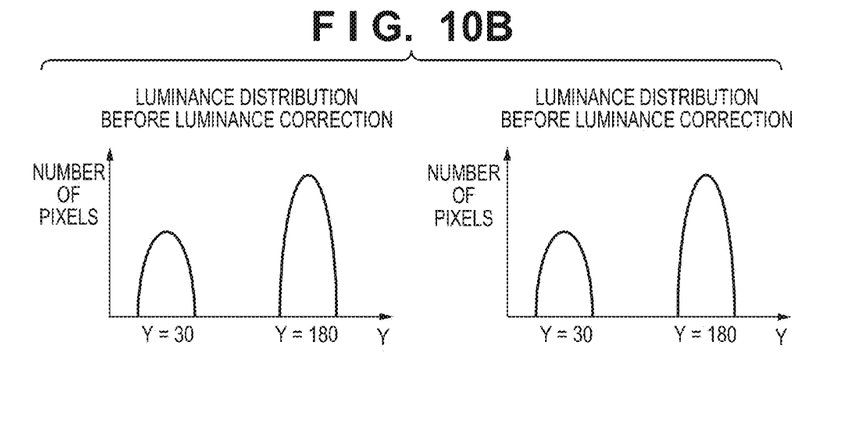

A difference between correction results which have been obtained by performing luminance correction for a low-frequency component region and a high-frequency component region, respectively, will be described with reference to FIGS. 10A to 10C. FIG. 10A shows an image 1000 having a low-frequency component as a whole, and an image 1010 having a high-frequency component as a whole. The images 1000 and 1010 are formed by high-luminance regions 1001 and 1011 with a median of 180 of the luminance distribution, and low-luminance regions 1002 and 1012 with a median of 30 of the luminance distribution, respectively. In the image 1000, there is one low-luminance region. To the contrary, in the image 1010, there are a plurality of low-luminance regions, and there is a high-luminance region between the low-luminance regions. Thus, the image 1010 has a high frequency component. In this case, the number of pixels of the low-luminance region 1002 of the image 1000 is equal to the total number of pixels of the low-luminance regions 1012 of the image 1010, and the luminance distributions of the images are equal to each other, as shown in FIG. 10B.

Figure 10C:
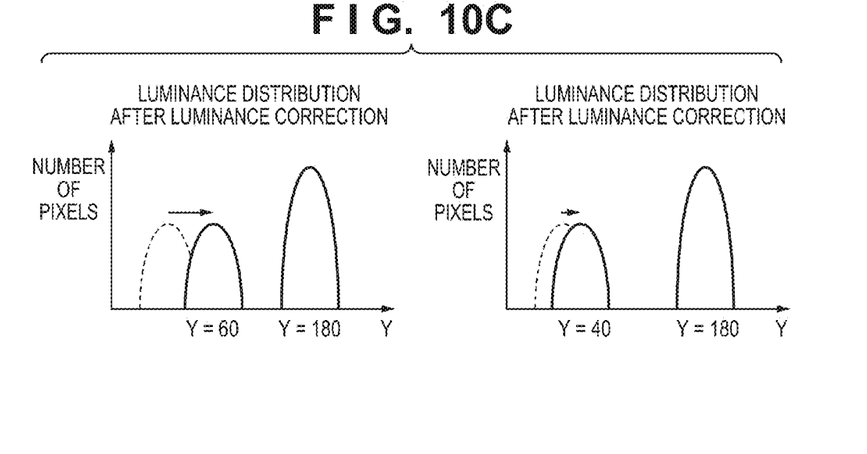
Figure 11:
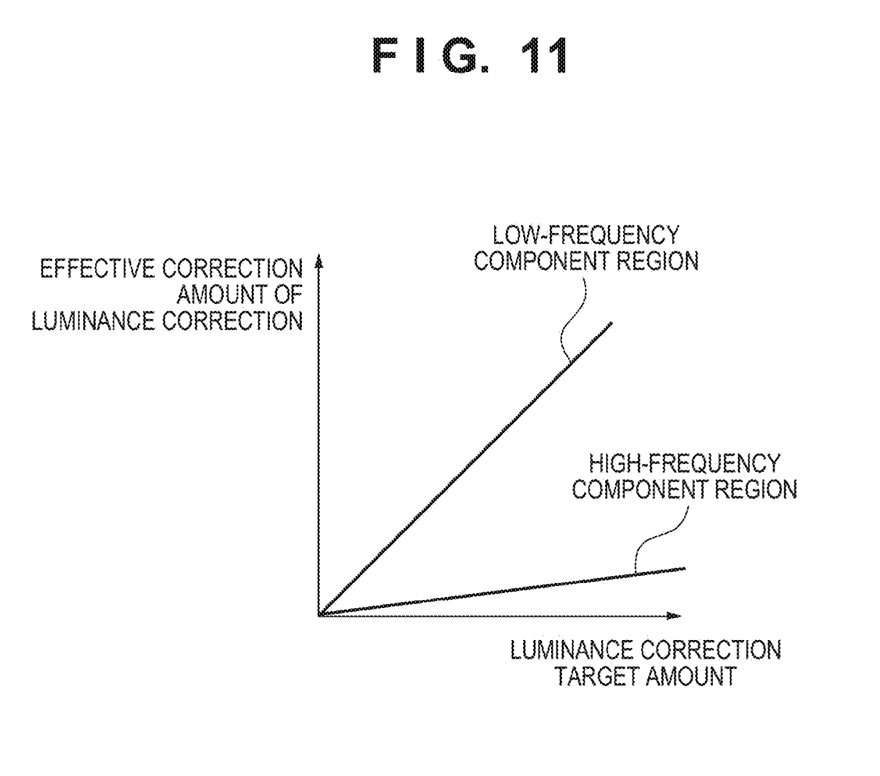
FIG. 11 is a graph showing the relationship between a target amount and an effective correction amount in luminance correction for each frequency component of the images.

If luminance correction for increasing the luminance of the low-luminance region is applied to the images 1000 and 1010, changes in luminance distributions of the images after the processing are different from each other, as shown in FIG. 10C. More specifically, the median of the luminance distribution of the low-luminance region 1002 of the image 1000 increases to 60, while that of the luminance distribution of the low-luminance regions 1012 of the image 1010 increases to only 40. That is, the effect of luminance correction for the low-luminance region changes depending on whether the surrounding region of the target region is a low-frequency component region or a high-frequency component region, as shown in FIG. 11. FIG. 11 shows that a correction amount after actual correction for the high-frequency component region is smaller than that for the low-frequency component region for a given luminance correction target amount; that is, only a small correction effect is produced for the former region.

On the other hand, in the image 902 of FIG. 9B, since the sky region other the surrounding region of the tree is a low-frequency component region where the luminance gradually changes, a problem that, for example, the edges blur does not arise. As shown in the image 902, however, it becomes impossible to reproduce the luminance gradation by assigning a luminance to each signal level range. Especially in a region with a high luminance, a luminance difference caused by tone assignment readily stands out, thereby giving the user the impression that degradation in tone has occurred in the corrected image.

That is, since luminance correction for a high-frequency component region of the image reduces the resolution of the image, it is preferable not to apply luminance correction to the region, or to limit the correction amount of luminance correction. Furthermore, since luminance correction for a low-frequency component region with a high luminance level of the image may give the user the impression that degradation in tone of the image has occurred, it is preferable not to apply luminance correction to the region, or limit a correction amount. Thus, Japanese Patent Laid-Open No. 2008-072604 proposes a method of applying luminance correction of a low-luminance region in a backlit scene by limiting it to a low-frequency component region.

To perform luminance correction for a low-frequency component region with a low luminance level as described in Japanese Patent Laid-Open No. 2008-072604, it is necessary to extract the low-frequency component region by, for example, performing fast Fourier transform for an image signal obtained by capturing an image. When an image capturing apparatus shoots a still image, an image capturing circuit and correction circuit perform luminance correction for the still image to be recorded, according to the following procedure.

1. Develop the captured image signal
2. Convert the developed image into a luminance image
3. Extract a low-frequency component region from the luminance image
4. Decide a target luminance correction amount based on the luminance level of the low-frequency component region
5. Perform luminance correction for the low-frequency component region of the developed image with the decided target luminance correction amount
6. Record the image having undergone the luminance correction If, however, successively captured and obtained images are sequentially input to the correction circuit when, for example, a moving image is shot or live view is active, it is necessary to sequentially perform luminance correction for the input images and output them. That is, timing constraints are imposed on processing from a shooting instruction to a recording operation unlike a still image, that is, a case in which other images are input to the correction circuit.

In shooting a moving image, for example, it is necessary to execute, in parallel, in each frame, correction amount decision processing of deciding a target luminance correction amount based on a captured and obtained image, and recording processing of recording a frame image by performing luminance correction with the target luminance correction amount for a low-frequency component region of the captured and obtained image. In this case, the processes need to be individually performed in different lines at the same time. It is, however, not realistic to provide, in each line, a circuit for extracting a low-frequency component region from a luminance image, since this increases the circuit scale, cost, or power consumption. Considering the above-described problem when luminance correction is performed for a high-frequency component region, it is necessary to provide a circuit for extracting a low-frequency component region on the recording processing line side.

Although it is also possible to provide a circuit for extracting a low-frequency component region on the correction amount decision processing line side, and holding information indicating a low-frequency component region used for the correction amount decision processing and then using it for the recording processing, in the following problem arises in that case. When the correction amount decision processing and the recording processing are simultaneously executed, it is impossible to perform correction processing after a target luminance correction amount is decided unlike a still image because of the timing constraints. The decided target luminance correction amount, therefore, can only be used for the next frame and subsequent frames. That is, if an object is expected to move like a moving image, a low-frequency component region may change between a frame used to decide the correction amount and that to undergo luminance correction when performing luminance correction using the target luminance correction amount. Therefore, luminance correction may be performed for a high-frequency component region, thereby causing degradation in image quality, as described above.

In an arrangement in which the circuit for extracting a low-frequency component region is provided on the recording processing line side, when successively captured and obtained, images subsequently undergo luminance correction, in which a target luminance correction amount is decided based on the luminance levels of pixels which include those in a high-frequency component region. If luminance correction is performed using the thus decided target luminance correction amount for a low-frequency component region of the developed image, the low-frequency component region may not be appropriately corrected; for example, the region may be overcorrected. Thus, a high-quality corrected image may not be output.

SUMMARY OF THE INVENTION

The present invention has been made in consideration of the problems of the conventional technique. The present invention provides an image capturing apparatus which outputs an image as a preferred luminance correction result even when a target luminance correction amount is decided without considering frequency components, a control method for the image capturing apparatus, and a recording medium.

According to one aspect of the present invention, there is provided an image capturing apparatus comprising: an image capturing unit configured to sequentially output images obtained by capturing an object; a decision unit configured to decide a luminance correction target amount based on a luminance distribution of the image output by the image capturing unit; a specification unit configured to specify a low-frequency region of a target image output by the image capturing unit; a correction unit configured to perform luminance correction with the target amount decided in advance by the decision unit for a pixel, among pixels included in the target image, which is included in the low-frequency region specified by the specification unit and has a luminance value not larger than a predetermined value; an obtaining unit configured to obtain an effective correction amount based on a luminance distribution of the target image before the correction and a luminance distribution of the target image after the correction, which has been corrected by the correction unit with the target amount decided in advance; and an output unit configured to output the target image after the correction, wherein the decision unit decides a luminance correction target amount for a next correction target image based on the luminance distribution of the target image and a ratio of the effective correction amount to the target amount decided in advance.

According to another aspect of the present invention, there is provided a control method for an image capturing apparatus, comprising: an image capturing step of sequentially outputting images obtained by capturing an object; a decision step of deciding a luminance correction target amount based on a luminance distribution of the image output in the image capturing step; a specification step of specifying a low-frequency region of a target image output in the image capturing step; a correction step of performing luminance correction with the target amount decided in advance in the decision step for a pixel, among pixels included in the target image, which is included in the low-frequency region specified in the specification step and has a luminance value not larger than a predetermined value; an obtaining step of obtaining an effective correction amount based on a luminance distribution of the target image before the correction and a luminance distribution of the target image after the correction, which has been corrected in the correction step with the target amount decided in advance; and an output step of outputting the target image after the correction, wherein in the decision unit, a luminance correction target amount for a next correction target image is decided based on the luminance distribution of the target image and a ratio of the effective correction amount to the target amount decided in advance.

Further features of the present invention will become apparent from the following description of exemplary embodiments (with reference to the attached drawings).

DESCRIPTION OF THE EMBODIMENTS

Exemplary embodiments of the present invention will be described in detail below with reference to the accompanying drawings. Note that in an embodiment to be explained below, a case in which the present invention is applied to a digital camera as an example of an image capturing apparatus which can sequentially perform luminance correction for successively captured and obtained images will be described. The present invention, however, is applicable to an arbitrary device which can perform luminance correction for sequentially output images.

<Functional Arrangement of Digital Camera 100>

Figure 1:
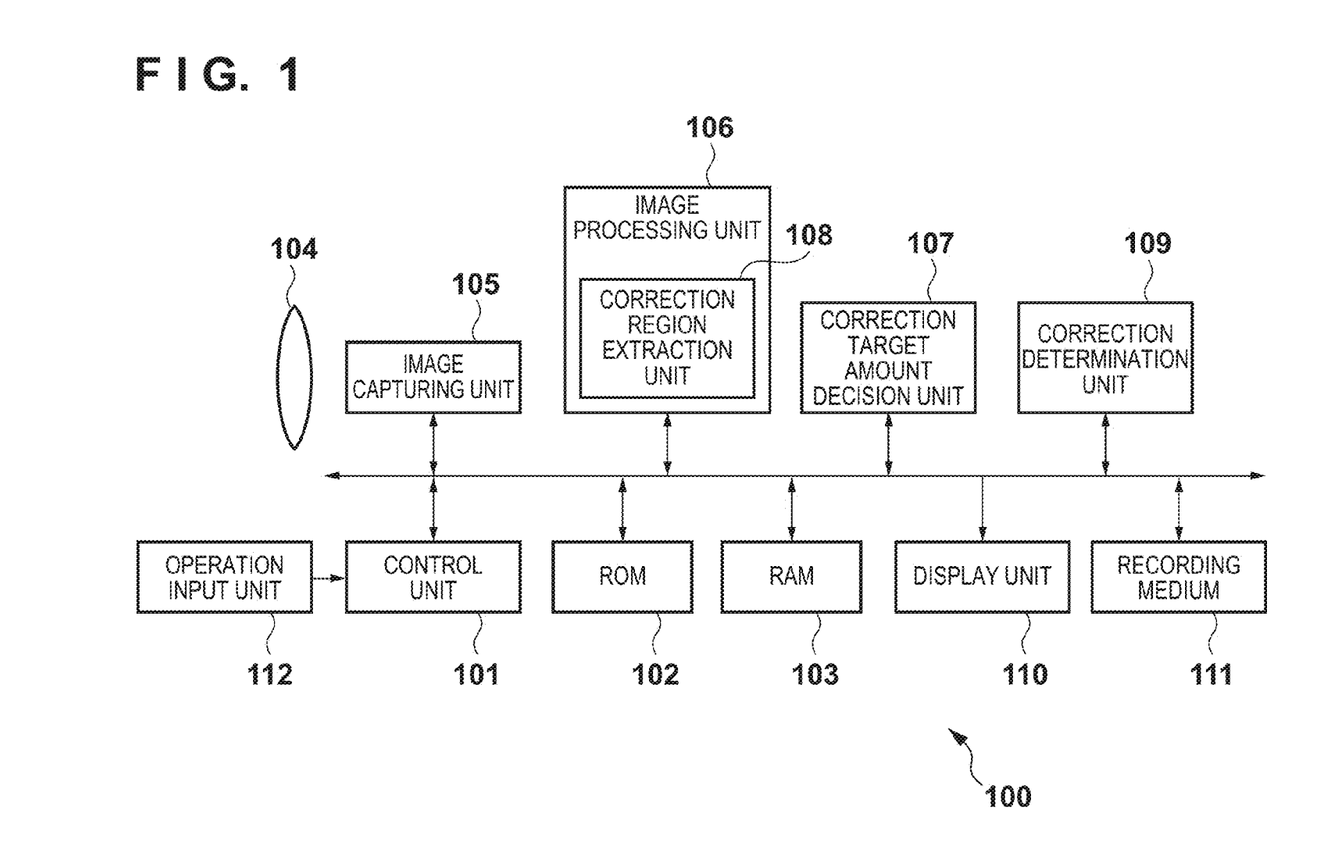
FIG. 1 is a block diagram showing the functional arrangement of a digital camera 100 according to an embodiment of the present invention.

FIG. 1 is a block diagram showing the functional arrangement of a digital camera 100 according to the embodiment of the present invention.

A control unit 101 is, for example, a CPU, which controls the operation of each block of the digital camera 100. More specifically, the control unit 101 controls the operation of each block by reading out the operation program of live view processing (to be described later) from a ROM 102, mapping the program on a RAM 103, and executing the program.

The ROM 102 is, for example, a rewritable non-volatile memory, which stores information such as parameters necessary for the operation of each block of the digital camera 100 as well as the operation program of the live view processing.

The RAM 103 is a volatile memory, which is used as not only a mapping area for the operation program of the live view processing but also a storage area for temporarily storing intermediate data output in the operation of each block of the digital camera 100.

Assume in this embodiment that processing in each block of the digital camera 100 is implemented by hardware. The present invention, however, is not limited to this, and the processing in each block may be implemented by a program for executing processing similar to that in each block.

An image capturing unit 105 includes, for example, an image sensor such as a CCD or CMOS sensor, which photoelectrically converts an optical image formed by an imaging optical system 104 on the image sensor. The image capturing unit 105 applies A/D conversion processing to an analog image signal obtained by photoelectrical conversion, and outputs the thus obtained digital image signal to an image processing unit 106.

The image processing unit 106 executes development processing including color conversion processing and luminance correction processing for the input digital image signal, and generates a live view screen to be displayed on a display unit 110 (to be described later), an image to be recorded in a recording medium 111, or a frame image of a moving image. The image processing unit 106 performs luminance correction for a pixel which has a luminance value falling within a predetermined low-luminance range, and belongs to a low-frequency component region. In this embodiment, the image processing unit 106 includes a correction region extraction unit 108 (to be described later), and obtains information of a region or pixel to undergo luminance correction from the correction region extraction unit 108.

The image processing unit 106 also generates an image which has not undergone luminance correction in addition to the image which has undergone luminance correction in the developing processing. A correction target amount decision unit 107 (to be described later) decides information of a luminance correction target amount based on the image which has undergone luminance correction and the image which has not undergone luminance correction. More specifically, the image processing unit 106 generates a luminance image for each of the image which has undergone luminance correction and the image which has not undergone luminance correction, in order to decide a luminance correction target amount. Then, the image processing unit 106 outputs, to the correction target amount decision unit 107 or a correction determination unit 109, the luminance image of the image which has undergone luminance correction, and that of the image which has not undergone luminance correction.

The correction target amount decision unit 107 decides a correction target amount (EV value) for luminance correction in the image processing unit 106. More specifically, for the luminance image of the image which has not undergone luminance correction and has been input by the image processing unit 106, the correction target amount decision unit 107 obtains information of the number of pixels with a luminance falling within the predetermined low-luminance range. The correction target amount decision unit 107 decides a luminance correction target amount based on the number of low-luminance pixels. The correction target amount decision unit 107 outputs and stores information of the decided luminance correction target amount in, for example, the RAM 103. Assume that information indicating the predetermined low-luminance range may represent an upper limit threshold such that a value below the threshold is determined as a low luminance, and is stored in, for example, the ROM 102.

Note that if the digital camera 100 has a face detection function of detecting a face region of a person, it is preferable to set a luminance correction target amount so as to obtain the correct exposure of the face region. On the other hand, if luminance correction is performed so as to obtain the correct exposure of a low-luminance region like a backlit scene where no person exists, the corrected image may look unnatural to the user. In this embodiment, therefore, in view of the latter situation, a luminance correction target amount is decided based on the number of pixels of the low-luminance region. A method of setting a luminance correction target amount, however, is not limited to this, and the method may be changed as needed according to a shooting mode or user settings.

The correction region extraction unit 108 extracts information of the position of a region or pixel to undergo luminance correction in the image processing unit 106. More specifically, the correction region extraction unit 108 analyzes frequency components by, for example, performing fast Fourier transform for the digital image signal input to the image processing unit 106, and extracts a low-frequency component region (low-frequency region). Note that by assuming that information of a low-frequency band is stored in, for example, the ROM 102, the correction region extraction unit 108 obtains the information to extract a low-frequency region. Then, the correction region extraction unit 108 refers to the luminance component of each pixel of the extracted low-frequency region, and further extracts a pixel with a luminance falling within the predetermined low-luminance range. The correction region extraction unit 108 outputs, to the image processing unit 106, the thus obtained information of the position of the low-luminance pixel included in the low-frequency component region.

Based on the luminance correction target amount and an actual correction amount (effective correction amount) of the image which has undergone luminance correction with the target amount, the correction determination unit 109 evaluates the luminance correction with the target amount. The correction determination unit 109 analyzes the effective correction amount obtained by luminance correction using the luminance image of the input image which has undergone the luminance correction and the luminance image of the input image which has not undergone the luminance correction. The correction determination unit 109 determines based on the effective correction amount and the correction target amount used for the luminance correction whether the result of the luminance correction with the target amount indicates overcorrection, and then decides a coefficient (target amount adjustment coefficient) for adjusting the luminance correction target amount. The correction determination unit 109 outputs and stores information of the decided target amount adjustment coefficient in, for example, RAM 103. The thus decided target amount adjustment coefficient is also used to decide a luminance correction target amount by the correction target amount decision unit 107.

The display unit 110 serves as the display device of the digital camera 100, such as a small LCD. In the live view processing (to be described later) according to this embodiment, the image which has undergone luminance correction by the image processing unit 106 is displayed on the display unit 110. More specifically, after luminance correction by the image processing unit 106 is completed, the image processing unit 106 outputs the corrected image to the display unit 110 under control of the control unit 101. For the input corrected image, the display unit 110 controls to read out data to be superimposed from a group of GUI data stored in the ROM 102, and to superimpose it, thereby displaying the obtained image.

The recording medium 111 is the internal memory of the digital camera 100, or a recording device detachably connected to the digital camera 100, such as a memory card or HDD. When the digital camera 100 shoots a moving image, the image which has undergone luminance correction in the image processing unit 106 is recorded in the recording medium 111. A description thereof will be omitted in this embodiment. Assume in this case that the image processing unit 106 encodes the image having undergone luminance correction in an encoding format according to the recording format of the moving image, and outputs the obtained image.

An operation input unit 112 is a user interface such as the release button and menu button of the digital camera 100. Upon detecting the user operation of the operation member of the digital camera 100, the operation input unit 112 outputs a control signal corresponding to the operation to the control unit 101.

<Live View Processing>

The live view processing of the digital camera 100 with such arrangement according to this embodiment will be described in detail with reference to a flowchart shown in FIG. 2. It is possible to implement processing corresponding to the flowchart when, for example, the control unit 101 reads out a corresponding processing program stored in the ROM 102, maps the program on the RAM 103, and then executes the program. Assume that the live view processing starts when, for example, the digital camera 100 is activated in a shooting mode.

In step S201, the control unit 101 executes AE processing, and decides exposure conditions. More specifically, the control unit 101 causes a photometry unit (not shown) to measure light from an object, and decides exposure conditions such as a shutter speed, aperture value, and sensitivity setting based on an obtained measurement result.

In step S202, the control unit 101 causes the image capturing unit 105 to capture the object. More specifically, according to the exposure conditions decided in step S201, the control unit 101 causes a timing generator (not shown) to generate a timing signal to instruct the image capturing unit 105 to perform exposure and to read out an analog image signal from the image sensor, thereby outputting the generated signal to the image capturing unit 105. The image capturing unit 105 performs exposure, and reads out the analog image signal in response to the timing signal. The image capturing unit 105 applies A/D conversion processing to the analog image signal, and outputs the thus obtained digital image signal to the image processing unit 106.

After step S202, the control unit 101 executes the following processes in steps S203, S204, and S205 in parallel.

In step S203, the control unit 101 executes AE processing similarly to step S201, and decides exposure conditions for next exposure. In step S204, the control unit 101 executes AF processing according to a contrast detection method, and controls drive of a focus lens included in the imaging optical system 104. More specifically, the control unit 101 detects the defocus amount of the object with respect to the obtained digital image signal, decides the driving position of the focus lens based on the defocus amount, and causes a focus lens driving unit (not shown) to drive the focus lens to the driving position.

In step S205, the control unit 101 executes luminance correction processing to decide a luminance correction target amount, and to display, on the display unit 110, the image which has been applied with luminance correction. Upon completion of the processes in steps S203, S204, and S205 in one frame time, the control unit 101 returns the process to step S202 to expose a next frame.

(Luminance Correction Processing)

Figure 3:
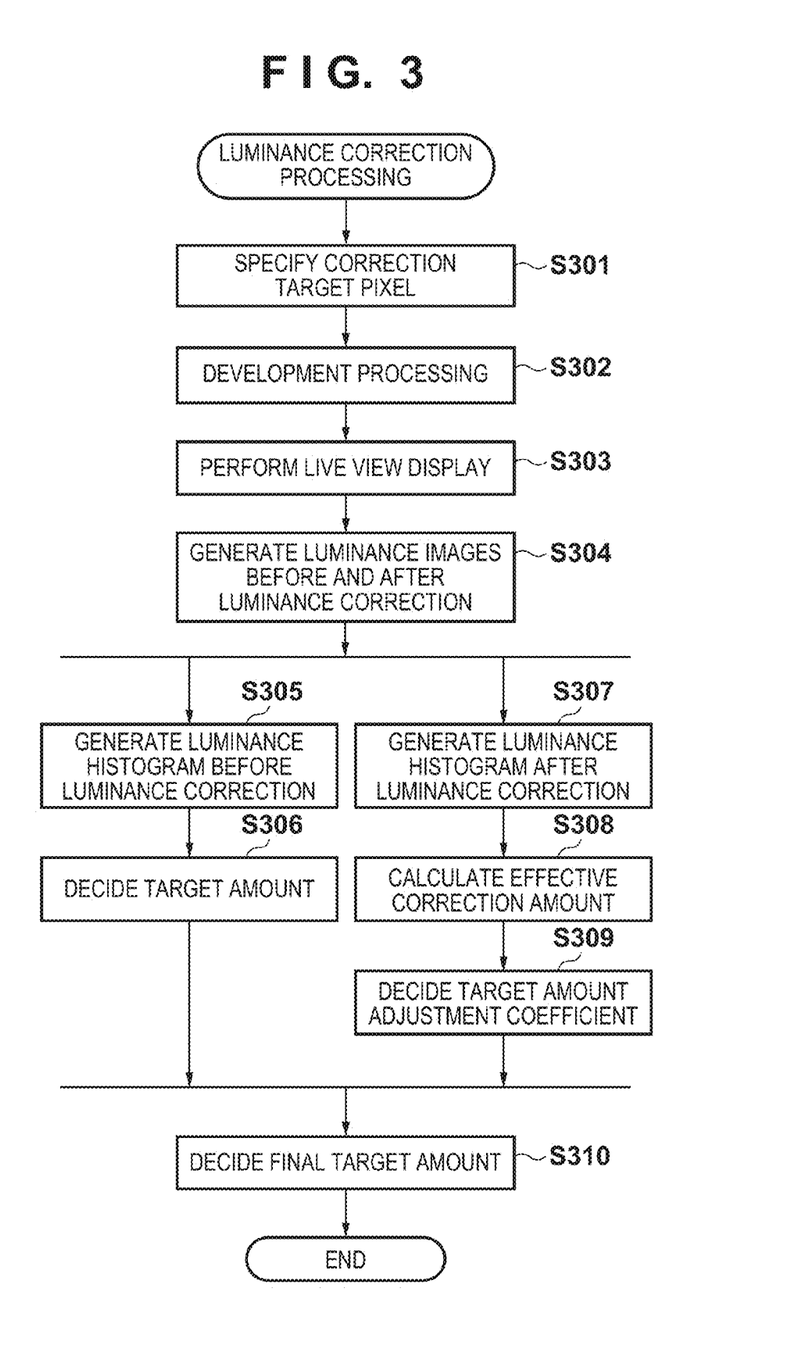
FIG. 3 is a flowchart illustrating luminance correction processing according to the embodiment of the present invention.

The luminance correction processing according to the embodiment will be further described with reference to a flowchart shown in FIG. 3.

In step S301, the control unit 101 causes the correction region extraction unit 108 to specify a pixel to undergo luminance correction among pixels contained in the digital image signal (target image) input to the image processing unit 106. More specifically, the correction region extraction unit 108 specifies a low-frequency region by executing fast Fourier transform for the input luminance image. Furthermore, the correction region extraction unit 108 specifies a pixel, among those included in the specified low-frequency region, which has a luminance component with a predetermined value or smaller, and outputs information for specifying the pixel to the image processing unit 106.

In step S302, the control unit 101 causes the image processing unit 106 to execute development processing for the digital image signal. The control unit 101 first causes the image processing unit 106 to generate an image which has been applied with luminance correction and is to be displayed as a live view image on the display unit 110. More specifically, the control unit 101 obtains the information of the luminance correction target amount which has been decided in advance and stored in the RAM 103, and inputs the obtained information to the image processing unit 106. The image processing unit 106 reads out, from the ROM 102, a correction curve, corresponding to the luminance correction target amount, for deciding a correction amount for the luminance component of each pixel. For the correction target pixel which has been specified by the correction region extraction unit 108 in step S301, the image processing unit 106 performs luminance correction with the correction amount which has been decided based on the correction curve corresponding to the luminance correction target amount. In addition to the image which has been applied with the luminance correction, the control unit 101 causes the image processing unit 106 to generate an image which has not been applied with the luminance correction. That is, in this step, the image processing unit 106 executes the development processing of simultaneously generating an image which has been applied with the luminance correction and an image which has not been applied with the luminance correction. Note that it is assumed that the "last" decided luminance correction target amount is used as "the luminance correction target amount decided in advance". The luminance correction target amount, however, is not limited to this.

In step S303, the control unit 101 causes the image processing unit 106 to transmit, to the display unit 110, the image which has been applied with the luminance correction and generated in step S302, and causes the display unit 110 to display the image as a live view image.

Figure 4:
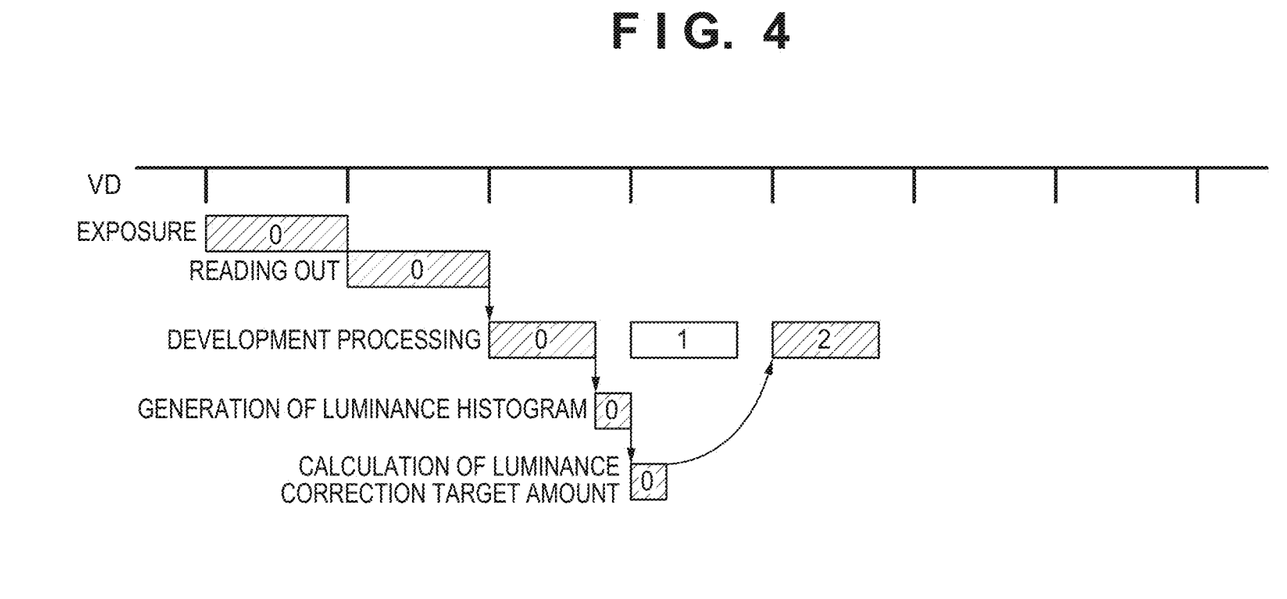
FIG. 4 is a timing chart showing each process of the live view processing according to the embodiment of the present invention.

Note that the luminance correction target amount used for the luminance correction in the development processing in step S302 is "the last decided luminance correction target amount". In this embodiment, digital image signals which are successively captured and sequentially output from the image capturing unit 105 are presented, with a minimum delay, as a live view image after performing luminance correction. A luminance correction target amount corresponding to the digital image signal output from the image capturing unit 105 is, therefore, decided after an image obtained by applying luminance correction to an image corresponding to the digital image signal is displayed, as shown in FIG. 4. That is, a target amount used for the luminance correction in step S302 is the latest target amount which has been decided by the correction target amount decision unit 107 and stored in the RAM 103 for the digital image signal captured and obtained before the digital image signal output from the image capturing unit 105.

Referring to FIG. 4, after exposure, reading out of an analog image signal from the image sensor, and development processing are performed according to vertical synchronizing (VD) signals, a luminance histogram is generated, and a luminance correction target amount is decided. In this example, a luminance correction target amount decided for an image captured in one frame is used for luminance correction for an image captured two frames after that frame. The correction target image for which the decided luminance correction target amount is used is not limited to this, and can be changed according to the processing speed of the control unit 101, the number of effective pixels of the image sensor, or the number of pixels for which a luminance histogram is generated.

Note that in the example of FIG. 4, it is assumed that a value (EV=0) with which an image does not change before and after luminance correction is set as a target amount until a luminance correction target amount is decided based on an actually captured and obtained digital image signal.

In step S304, the control unit 101 causes the image processing unit 106 to generate a luminance image formed by luminance components by converting pixel values for each of the image which has been applied with the luminance correction and the image which has not been applied with the luminance correction, both of which have been generated in step S302. Under the control of the control unit 101, the image processing unit 106 outputs, to the correction target amount decision unit 107, the luminance image of the image which has not been applied with the luminance correction. Furthermore, under the control of the control unit 101, the image processing unit 106 outputs, to the correction determination unit 109, the luminance image of the image which has been applied with the luminance correction.

After step S304, the control unit 101 executes, in parallel, the processing in steps S305 and S306, and processing in steps S307 to S309. A unit which performs the processing in steps S305 and S306 is different from that which performs the processing in steps S307 to S309. In this embodiment, the correction target amount decision unit 107 executes the former processing and the correction determination unit 109 executes the latter processing.

In step S305, the control unit 101 causes the correction target amount decision unit 107 to generate a luminance histogram for the image which has not been applied with the luminance correction. More specifically, the correction target amount decision unit 107 analyzes the luminance distribution of the luminance image by referring to the luminance value (0 to 255) of each pixel of the luminance image, thereby generating a luminance histogram. Note that in this step, under the control of the control unit 101, the correction target amount decision unit 107 outputs, to the correction determination unit 109, the generated luminance histogram of the image which has not been applied with the luminance correction.

In step S306, the control unit 101 causes the correction target amount decision unit 107 to decide a luminance correction target amount. More specifically, the correction target amount decision unit 107 refers to the luminance histogram generated in step S305, and decides a new luminance correction target amount based on the number of pixels with a luminance value equal to or smaller than a predetermined value which is determined as a low luminance.

On the other hand, in step S307, the control unit 101 causes the correction determination unit 109 to generate a luminance histogram for the image which has been applied with the luminance correction. Upon receiving the luminance histogram for the image which has not been applied with the luminance correction from the correction target amount decision unit 107, the control unit 101 advances the process to step S308.

In step S308, the control unit 101 causes the correction determination unit 109 to compare the luminance histogram of the image which has been applied with the luminance correction with that of the image which has not been applied with the luminance correction, and to calculate an effective correction amount. In this embodiment, the effective correction amount is calculated by the following method.

(Calculation of Effective Correction Amount)

Figure 5A:
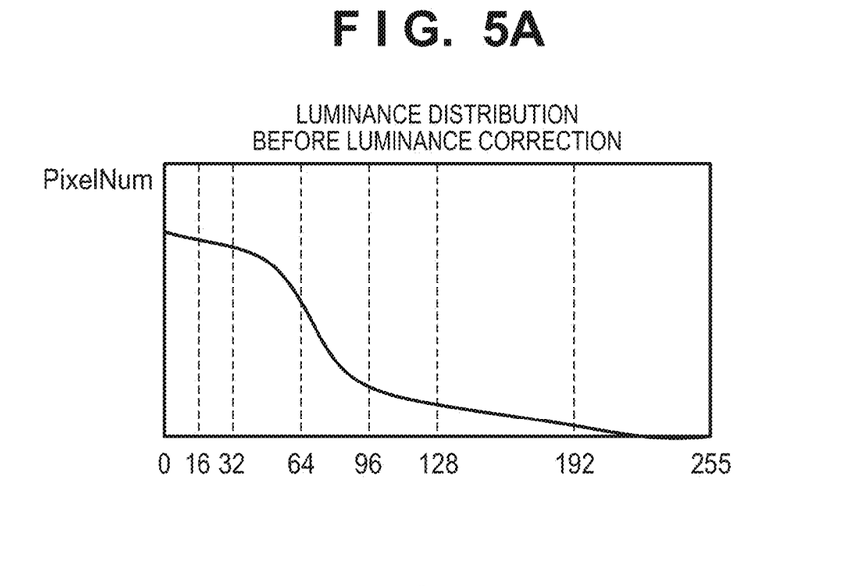
FIGS. 5A and 5B are graphs showing examples of luminance distributions before and after luminance correction according to the embodiment of the present invention.

If, for example, the luminance histogram of the image which has not been applied with the luminance correction is as shown in FIG. 5A, the correction determination unit 109 obtains, for each predetermined luminance value, the number of pixels with a luminance value which falls within the range from a minimum value 0 to the predetermined luminance value. In this embodiment, the predetermined luminance value is indicated by Y1 in FIG. 6. The correction determination unit 109 obtains the number (PixelNum) of pixels with a luminance value which falls within a range up to each luminance value.

Figure 5B:
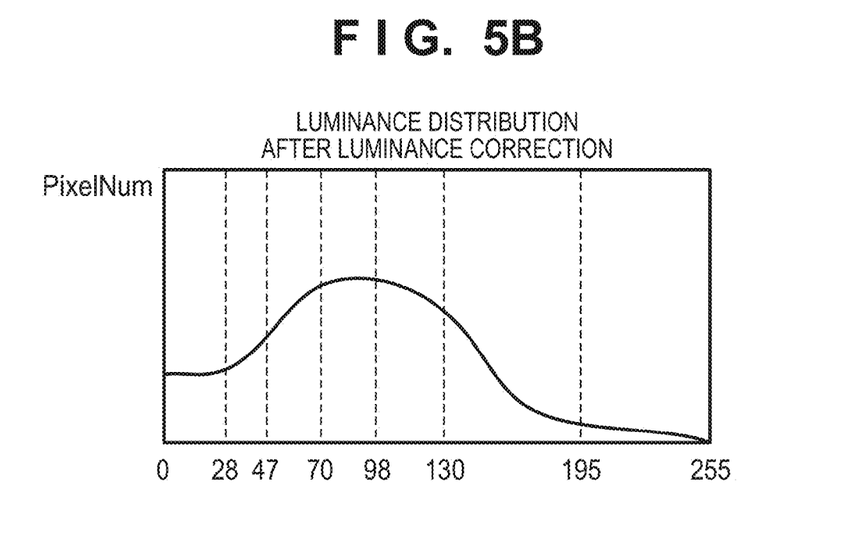
Figure 6:
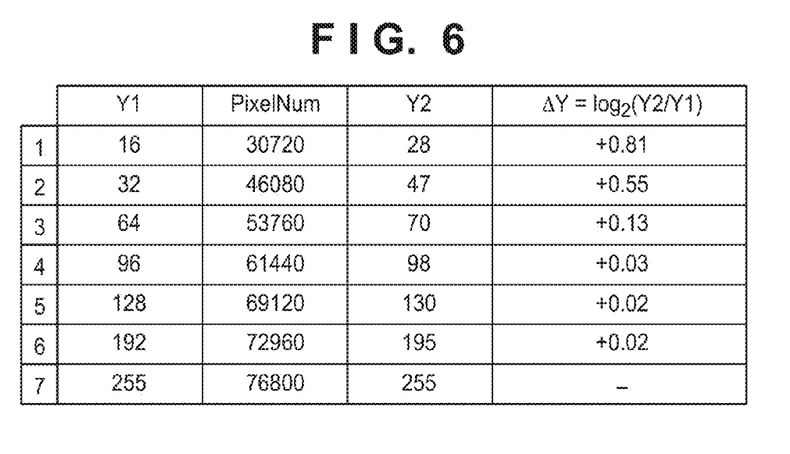
FIG. 6 is a table for explaining an effective correction amount obtained by luminance correction according to the embodiment of the present invention.

The correction determination unit 109 refers to the luminance histogram (FIG. 5B) of the image which has been applied with the luminance correction to specify a luminance value (Y2) such that the accumulated number of pixels with a luminance value which falls within the range from the minimum value 0 to the luminance value (Y2) reaches (exceeds) PixelNum. That is, the correction determination unit 109 analyzes an extended luminance range within which pixels distributed within a specific luminance range before the luminance correction are distributed after the luminance correction. Then, the correction determination unit 109 calculates an effective correction amount $\Delta Y$ obtained by the luminance correction for each predetermined luminance value according to:

$$\Delta Y = \log_2(Y2/Y1)$$

Calculating the effective correction amount by the APEX system makes it easy to compare it with the EV value of the APEX system as a luminance correction target amount.

In step S309, the control unit 101 causes the correction determination unit 109 to decide a target amount adjustment coefficient based on the effective correction amount and the latest luminance correction target amount used for the development processing in step S302. More specifically, the correction determination unit 109 determines whether the effective correction amount exceeds the latest luminance correction target amount, that is, whether the effective correction amount with respect to the latest luminance correction target amount exceeds 1. That is, if the effective correction amount exceeds the latest luminance correction target amount, overcorrection has occurred by the luminance correction. If the correction determination unit 109 determines that the effective correction amount exceeds the latest luminance correction target amount, it decides the target amount adjustment coefficient to be 0, and stores it in the RAM 103; otherwise, it sets the target amount adjustment coefficient to 1, and stores it in the RAM 103.

In step S310, the control unit 101 causes the correction target amount decision unit 107 to decide, by reflecting the target amount adjustment coefficient, a final target amount to be used for next luminance correction. More specifically, the control unit 101 reads out the target amount adjustment coefficient from the RAM 103, and transmits it to the correction target amount decision unit 107. Then, the correction target amount decision unit 107 decides a final target amount for next luminance correction by multiplying the new luminance correction target amount decided in step S306 by the input target amount adjustment coefficient, and completes the luminance correction processing. That is, if it is determined in step S309 that overcorrection has occurred, the target amount for next luminance correction is set to 0, and thus luminance correction is not performed.

With the above processing, it is possible to determine whether the result of luminance correction indicates overcorrection, even if the luminance correction is performed using a target amount which has been decided without limiting to a low-frequency region. If it is determined that the result indicates overcorrection, it is possible to control not to perform luminance correction, thereby avoiding a situation in which images with an image quality degraded due to overcorrection are successively displayed or recorded.

Note that in this embodiment, if it is determined that the effective correction amount exceeds the latest luminance correction target amount, correction is controlled not to be performed in the next luminance correction. The present invention, however, is not limited to this. Processing of deciding a target amount for the next luminance correction may be modified as follows, or may be controlled by combining the following methods.

(1) Decrease a Target Amount in the Case of Overcorrection

If overcorrection occurs, the correction determination unit 109 may decide the target amount adjustment coefficient to be 1 or smaller, thereby decreasing a target amount for the next luminance correction to be smaller than the latest target amount.

(2) Do not Perform Correction when Correction Effects are not Expected

When the ratio of an effective correction amount to the latest luminance correction target amount is equal to or smaller than a predetermined threshold, correction effects are not expected even though luminance correction is performed for an image. In this case, the correction determination unit 109 may decide the target amount adjustment coefficient to be 0, thereby controlling a next target amount to be a value such that luminance correction is not performed. Alternatively, the correction determination unit 109 may decide the target amount adjustment coefficient to gradually approach 0, thereby controlling the next target amount to be a value equal to or smaller than the latest target amount. Note that a case in which correction effects are not expected even though luminance correction is performed includes, for example, a case in which there are many high-frequency component regions in an image, and a case in which the luminance of the whole image is high.

(3) Control a Target Amount Based on the Ratio of an Effective Correction Amount to the Latest Luminance Correction Target Amount If the ratio of an effective correction amount to the latest luminance correction target amount is not 1, this indicates that it is impossible to obtain a desired correction result even though luminance correction is performed using the target amount. As shown in FIG. 11, because the effective correction amount is proportional to the luminance correction target amount, it may be possible to obtain an almost preferred correction result by deciding a new target amount based on the difference between the latest luminance correction target amount and the effective correction amount. The correction determination unit 109 may control the next target amount to be a value which causes the luminance correction result to converge to a preferred result by deciding the target amount adjustment coefficient to be the reciprocal of the effective correction amount with respect to the latest luminance correction target amount.

Figure 7:
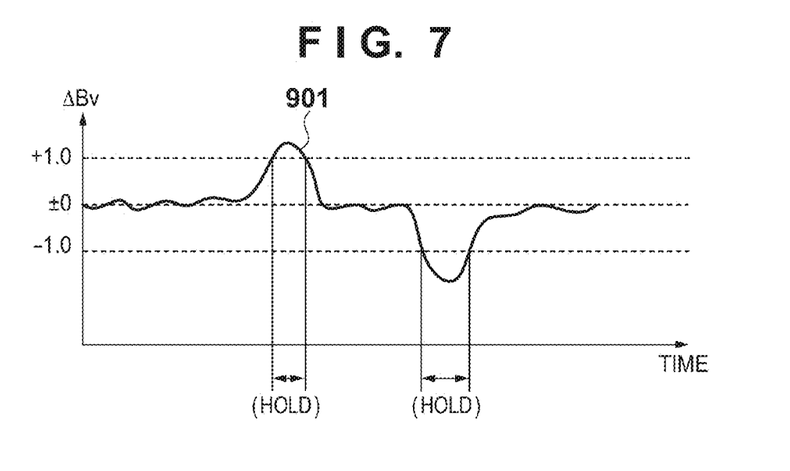
FIG. 7 is a timing chart for explaining control of a luminance correction target amount based on a difference with respect to the correct exposure according to the embodiment of the present invention.

(4) Control a Luminance Correction Target Amount Based on a Difference with Respect to the Correct Exposure As described above, AE processing is executed when live view display is performed or a moving image is shot. If an amount By of exposure for a main object changes due to a change in the object or a light source, the main object may deviate from the correct exposure. If the amount of exposure of the main object included in an image is not the correct exposure, the image may include a blown-out highlight region or a shadow-detail loss region. That is, even if a luminance correction target amount is decided using a luminance image corresponding to an image which has not been adjusted to the correct exposure, a preferred correction result may not be obtained. If, therefore, the absolute value of the difference between the correct exposure and the amount of exposure of the main object within the image is equal to or larger than a threshold, the correction determination unit 109 may decide the target amount adjustment coefficient to be 1 to hold the luminance correction target amount without any change, as shown in FIG. 7. In the example of FIG. 7, while the absolute value of the difference between the correct exposure and the amount of exposure of the main object is 1 or larger, the luminance correction target amount is held without any change.

Figure 8:
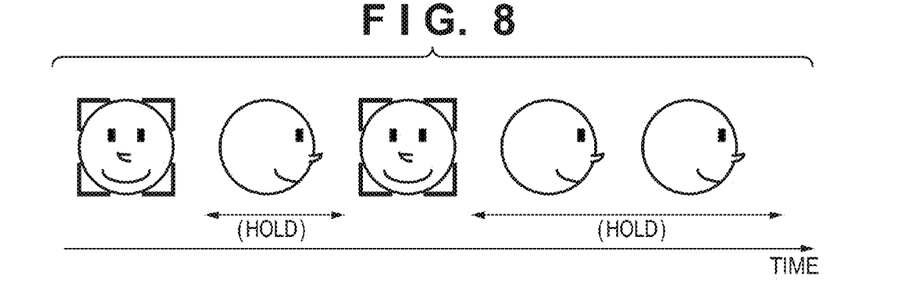
FIG. 8 is a timing chart for explaining control of a luminance correction target amount based on a face detection result according to the embodiment of the present invention.

(5) Control a Luminance Correction Target Amount Based on a Face Detection Result If the digital camera 100 has a function of detecting a face region, for an image where a face region has been detected, luminance correction is performed to obtain a correction exposure of the face region. To the contrary, for an image where no face region has been detected, because a region for which the correct exposure is to be obtained cannot be specified, luminance correction by analyzing a luminance distribution as described above is performed. A result of detecting a face region, however, may change depending on the face direction of a person. That is, if, for an image captured after an image where a face region has been detected, such as a next frame, luminance correction by analyzing a luminance distribution is performed when no face region is detected, a preferred correction result may not be obtained. Alternatively, since a correction result for each frame is different, the user may have the impression that the image flickers. If, therefore, no face region is detected in an image captured after a face region is detected, the correction determination unit 109 may hold the luminance correction target amount without any change, as shown in FIG. 8.

Note that depending on a change amount between the latest target amount and the target amount for next luminance correction, which has been decided in consideration of the target amount adjustment coefficient, a sudden change in luminance may occur in a luminance correction result, thereby causing the user to experience discomfort. If, therefore, the difference between the target amount for next luminance correction and the latest target amount exceeds a predetermined value defined as a change in luminance which does not cause the user to feel discomfort, the correction determination unit 109 may change the target amount for next luminance correction so that the difference is equal to or smaller than the predetermined value.

Figure 2:
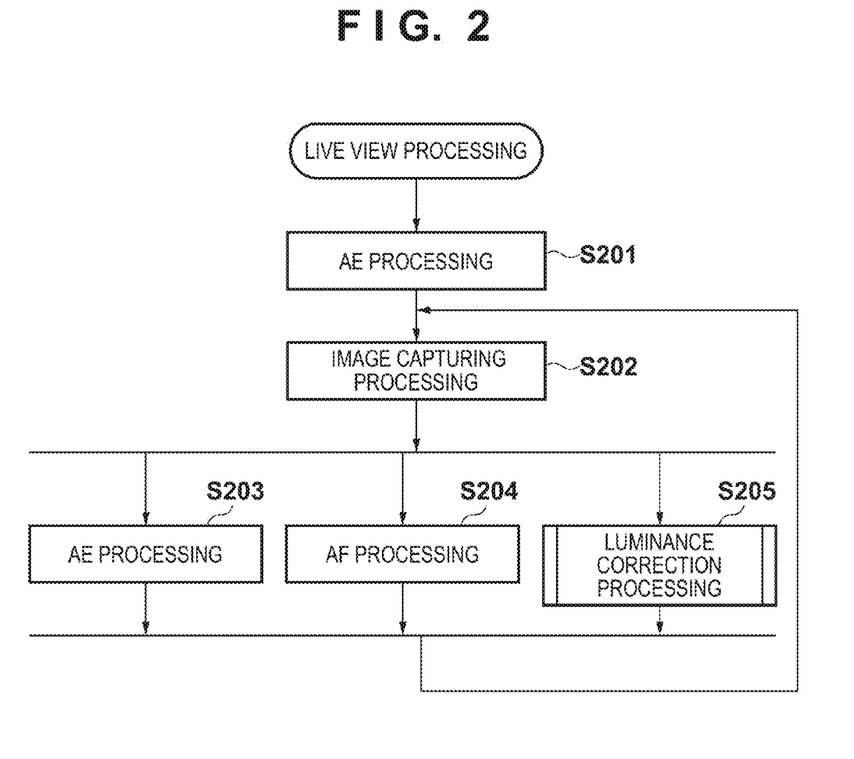
FIG. 2 is a flowchart illustrating live view processing according to the embodiment of the present invention.

In the above description, for descriptive convenience, assume that the process returns to step S202 after each of the processes in steps S203, S204, and S205 of the above flowchart shown in FIG. 2, which are executed in parallel, is completed. Since, however, images for live view are actually output from the image capturing unit 105 sequentially, the process may forcibly return to step S202 when, for example, one frame time has elapsed after start of the development processing, as shown in FIG. 4. In this case, the processing in step S304 and subsequent steps of the luminance correction processing in step S205 is continuously executed even after one frame time has elapsed, as a matter of course.

As described above, the image capturing apparatus of this embodiment can output an image as a preferred luminance correction result even if a target luminance correction amount is decided without considering frequency components.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-199938, filed Sep. 13, 2011, which is hereby incorporated by reference herein in its entirety.

What is claimed is:

1. An image capturing apparatus comprising:
an image capturing unit configured to sequentially output images obtained by capturing an object;
a decision unit configured to decide a luminance correction target amount based on a luminance distribution of the image output by said image capturing unit;
a specification unit configured to specify a low-frequency region of a target image output by said image capturing unit;
a correction unit configured to perform luminance correction with the target amount decided in advance by said decision unit for a pixel, among pixels included in the target image, which is included in the low-frequency region specified by said specification unit and has a luminance value not larger than a predetermined value;
an obtaining unit configured to obtain an effective correction amount based on a luminance distribution of the target image before the correction and a luminance distribution of the target image after the correction, which has been corrected by said correction unit with the target amount decided in advance; and
an output unit configured to output the target image after the correction, wherein said decision unit decides a luminance correction target amount for a next correction target image based on the luminance distribution of the target image and a ratio of the effective correction amount to the target amount decided in advance.

2. The apparatus according to claim 1, wherein said decision unit sets, as a next target amount, a value obtained by multiplying the luminance correction target amount decided based on the luminance distribution of the target image by the reciprocal of the ratio of the effective correction amount to the target amount decided in advance.

3. The apparatus according to claim 1, wherein when the ratio of the effective correction amount to the target amount decided in advance is not larger than a threshold, said decision unit decides the next target amount to be a value not larger than the target amount decided in advance.

4. The apparatus according to claim 1, wherein said decision unit decides the next target amount to be a value such that a difference between the next target amount and the target amount decided in advance is not larger than a predetermined value.

5. The apparatus according to claim 1, wherein when the ratio of the effective correction amount to the target amount decided in advance exceeds 1, said decision unit decides the next target amount to be a value such that said correction unit does not perform luminance correction.

6. The apparatus according to claim 1, wherein when the ratio of the effective correction amount to the target amount decided in advance exceeds 1, said decision unit decides the next target amount to be a value smaller than the target amount decided in advance.

7. The apparatus according to claim 1, wherein when an absolute value of a difference between predetermined correct exposure and an amount of exposure of a main object in the target image which has been corrected with the correction amount decided in advance is not smaller than a threshold, said decision unit decides the next target amount to be a value such that said correction unit does not perform luminance correction.

8. The apparatus according to claim 1, further comprising a face detection unit configured to detect a face region in an image output by said image capturing unit, wherein when said face detection unit does not detect a face region in an image output by said image capturing unit after an image in which said face detection unit has detected a face region, said decision unit sets a luminance correction target amount to be equal to a target amount decided for the image in which the face region has been detected.

9. A control method for an image capturing apparatus, comprising:
an image capturing step of sequentially outputting images obtained by capturing an object;
a decision step of deciding a luminance correction target amount based on a luminance distribution of the image output in the image capturing step;
a specification step of specifying a low-frequency region of a target image output in the image capturing step;
a correction step of performing luminance correction with the target amount decided in advance in the decision step for a pixel, among pixels included in the target image, which is included in the low-frequency region specified in the specification step and has a luminance value not larger than a predetermined value;
an obtaining step of obtaining an effective correction amount based on a luminance distribution of the target image before the correction and a luminance distribution of the target image after the correction, which has been corrected in the correction step with the target amount decided in advance; and
an output step of outputting the target image after the correction, wherein in the decision step, a luminance correction target amount for a next correction target image is decided based on the luminance distribution of the target image and a ratio of the effective correction amount to the target amount decided in advance.

10. A non-transitory computer-readable recording medium recording a program for causing a computer to execute each step of a control method comprising:
an image capturing step of sequentially outputting images obtained by capturing an object;
a decision step of deciding a luminance correction target amount based on a luminance distribution of the image output in the image capturing step;
a specification step of specifying a low-frequency region of a target image output in the image capturing step;
a correction step of performing luminance correction with the target amount decided in advance in the decision step for a pixel, among pixels included in the target image, which is included in the low-frequency region specified in the specification step and has a luminance value not larger than a predetermined value;
an obtaining step of obtaining an effective correction amount based on a luminance distribution of the target image before the correction and a luminance distribution of the target image after the correction, which has been corrected in the correction step with the target amount decided in advance; and
an output step of outputting the target image after the correction, wherein in the decision step, a luminance correction target amount for a next correction target image is decided based on the luminance distribution of the target image and a ratio of the effective correction amount to the target amount decided in advance.

11. An image capturing apparatus comprising:
an image capturing unit configured to sequentially output image signals obtained by capturing an object;
a decision unit configured to decide a luminance correction target amount based on a luminance distribution of the image signal output by said image capturing unit;
a specification unit configured to specify a low-frequency region of a target image based on a target image signal output by said image capturing unit;
a correction unit configured to perform luminance correction with the luminance correction target amount decided in advance by said decision unit for a region in the target image, which is included in the low-frequency region specified by said specification unit and has a luminance value not larger than a predetermined value; and
an obtaining unit configured to obtain an effective correction amount based on a luminance distribution of the target image signal before the correction and a luminance distribution of the target image signal after the correction, which has been corrected by said correction unit with the luminance correction target amount decided in advance,
wherein said decision unit decides a new luminance correction target amount based on the luminance distribution of the target image signal and the effective correction amount.

12. A control method for an image capturing apparatus, the control method comprising:

an image capturing step of sequentially outputting image signals obtained by capturing an object;

a decision step of deciding a luminance correction target amount based on a luminance distribution of the image signal output in the image capturing step;

a specification step of specifying a low-frequency region of a target image based on a target image signal output in the image capturing step;

a correction step of performing luminance correction with the luminance correction target amount decided in advance in the decision step for a region in the target image, which is included in the low-frequency region specified in the specification step and has a luminance value not larger than a predetermined value; and an obtaining step of obtaining an effective correction amount based on a luminance distribution of the target image signal before the correction and a luminance distribution of the target image signal after the correction, which has been corrected in the correction step with the luminance correction target amount decided in advance, wherein in the decision step, a new luminance correction target amount is decided based on the luminance distribution of the target image signal and the effective correction amount.

* * * * *